United States Patent [19]
Sheffield et al.

[11] 3,774,870
[45] Nov. 27, 1973

[54] EMERGENCY ACTIVATING APPARATUS

[75] Inventors: Harold B. Sheffield, Novato; Abraham M. Reiter, Northridge, both of Calif.

[73] Assignee: Gulf & Western Industries, Inc., New York, N.Y.

[22] Filed: Jan. 12, 1970

[21] Appl. No.: 2,029

[52] U.S. Cl............. 244/122 B, 24/73 PH, 244/151
[51] Int. Cl........................................... B64d 25/06
[58] Field of Search............ 244/122 B, 151, 122 A, 244/122 AE, 147; 24/73 PH; 102/70.2, 16; 307/252 J

[56] References Cited
UNITED STATES PATENTS
| | | | |
|---|---|---|---|
| 3,567,158 | 3/1971 | Coyle | 244/122 B |
| 3,404,439 | 10/1968 | Jones et al. | 244/151 |
| 3,609,495 | 9/1971 | Seesselberg | 307/252 J X |

*Primary Examiner*—Trygve M. Blix
*Assistant Examiner*—Stephen G. Kunin
*Attorney*—Lindenberg, Freilich & Wasserman

[57] ABSTRACT

Apparatus for unlatching airmen from equipment to which they are fastened to permit emergency egress from an aircraft, including a squib for operating the unlatching mechanism and a reliable circuit for energizing the squib. The energizing circuit includes a portable battery which is connected to a capacitor at all times prior to and after the emergency egress, and a silicon controlled rectifier for discharging the capacitor through the squib when an emergency switch is closed. In one system where an airman is held by latch assemblies to a parachute canopy and to a seat, and where the airman routinely operates manual latches every time he enters and leaves the aircraft, a squib-operated latch is placed in series with each manual latch so that operation of either latch of a series separates the man from the one location on the parachute or seat. The manual latches are of a type which is of proven reliability and familiar manner of operation, and the squib-operated latches are placed between the manual latches and the equipment from which the airman must be separated.

7 Claims, 8 Drawing Figures

INVENTORS
HAROLD B. SHEFFIELD
ABRAHAM M. REITER
BY
Lindenberg & Freilich
ATTORNEYS

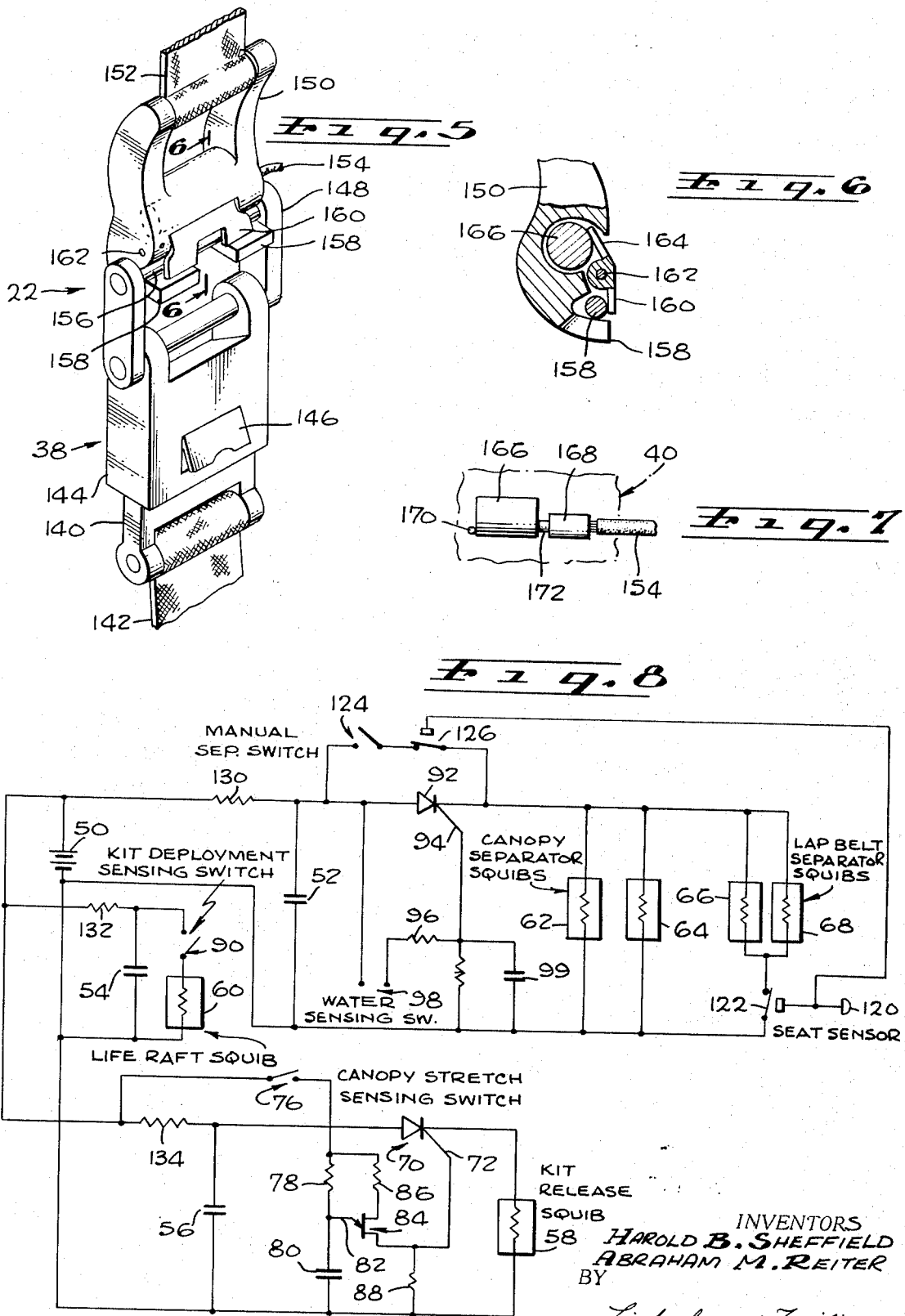

EMERGENCY ACTIVATING APPARATUS

BACKGROUND OF THE INVENTION

1. Field of the Invention:

This invention relates to apparatus for activating equipment in emergency situations.

2. Description of the Prior Art:

Military aircraft are generally constructed to enable rapid egress of the airmen in an emergency. In order to facilitate emergency egress during flight, some types of aircraft are provided with ejection seats which hold a parachute and life raft kit. The airman wears a torso harness with a pair of shoulder latch parts that connect to corresponding latch parts on the parachute, and a pair of lap belt latch parts that can latch to corresponding latch parts on a life raft kit in the seat. Every time the airman enters or leaves the craft during routine operations, he connects or disconnects the latches from the parachute and from the kit in the seat.

If an emergency egress is required during flight, the seat ejects from the aircraft and the parachute is opened. Several seconds later, the life raft kit may be opened and the life raft inflated. As soon as the airman hits the water or land, the parachute canopy is unlatched from him to prevent it from dragging him along the water or ground. It is desirable that the life raft kit deployment, life raft inflation, and separation of the canopy from the airman be accomplished automatically or with as little effort as possible on the part of the airman.

In the case of emergency egress on land, an aircraft carrier, or while the craft is in the water, the airman must be quickly released from all locations where he is held to equipment in the craft. This requires unlatching the two latches that hold him to the parachute and the two latches that hold him to the seat kit. While such unlatching can be accomplished manually, substantial time and effort may be required to find each of the four manually operable latches and operate them. Furthermore, if the airman is badly injured, he may not have the presence of mind required to find and operate the latches.

Automatic latches can be provided which utilize a small explosive charge, generally referred to as a squib, to operate the unlatching mechanism. Such squibs typically can be fired by a current pulse of several amperes. The required current pulse is generally too large to be obtained directly from a small, long-life, reliable battery such as the mercury type. However, small batteries or the aircraft power supply can be used to charge a small electrolytic capacitor which can supply the required current.

The use of an electrolytic capacitor to fire a squib poses some problems. One problem is that such capacitors require a forming voltage delivered over a period of time such as a few minutes, to make them efficient. Accordingly, it is not wise to charge a previously unused electrolytic capacitor only a few seconds before the time when it must deliver its charge. Another problem is that such capacitors cannot be relied upon to keep a full charge more than several minutes. Accordingly, the capacitors may discharge enough so that they will not fire a squib upon landing in the water, between the time of ejection at high altitude and a period of fifteen to twenty minutes later, when the pilot may land in the water. Accordingly, a small reliable energy supply would be desirable for operating a squib, if the supply could be ready at any time and could be easily carried outside the aircraft for use sometime after egress from the aircraft.

While the emergency egress apparatus preferably includes automatic latches for emergency use, such apparatus should also facilitate manual operation of latches. Facile manual operation is desirable to enable the airman to release himself in case he forgets about the automatic apparatus in an emergency, and for daily ingress and egress from the craft. Mechanical latches are presently in use which have been extensively tested so that they are of known reliability. Airmen are very familiar with the operation of such latches. It would be desirable to enable an automatic system to employ such manual latches. This would reduce the amount of reliability testing required for the latch system. In addition, the use of the previously employed latches would enable airmen already familiar with them, to correctly operate them in an emergency by instinctive reactions which they have already acquired.

OBJECTS AND SUMMARY OF THE INVENTION

An object of the present invention is to provide apparatus for the automatic activation of emergency equipment, which is compact and extremely reliable.

Another object is to provide a latching system for enabling either automatic or manual unlatching, which is reliable in emergency situations and convenient to utilize in normal routine operations.

In accordance with one embodiment of the invention, a system is provided for rapidly releasing an airman from his parachute canopy and seat kit in an emergency. The apparatus includes squib-operated latches and a circuit for operating the squibs in an emergency. The circuit includes a reliable and portable energy cell, or battery, which is connected to a capacitor that can supply current to fire the squibs. The battery is continually connected to the capacitor prior to and after an emergency to keep the capacitor fully charged at all times (until it fires the squib). A silicon controlled rectifier is connected to a water sensing switch to discharge the capacitor through the squib to fire the squib when the airman is immersed in water. A manual switch is also provided to enable the airman to fire the squib by operating a manual switch. If the airman ejects during flight over water, then the squibs fire to release him from the parachute canopy as soon as he reaches the water. If egress is required while the craft is on a land or carrier-based field or after it is in the water, then the airman can operate the manual switch to quickly release himself from all latches that hold him in place. If the airman is injured and cannot manually operate a switch, then as soon as water partially fills the aircraft, the squibs are automatically fired to release the airman from the craft.

Each of the latch assemblies that hold the airman to one location on equipment in the craft includes an automatic latch and a manually operable latch, connected in series, so that release of either latch releases the man from the equipment location. The manual latch is of a type which is already commonly in use. This eliminates much of the reliability testing which is required for any new latching apparatus. In addition, airmen are already familiar with the mechanical latches currently in use and can instinctively operate them in an emergency. It should be appreciated that even if a combined automatic and manual latch were utilized where the manual portion operates in the same way as current latches, the difference in size and feel of the parts surrounding the release lever, as compared with the current latches which operate manually only, would hamper instinctive operation.

For those aircraft where the airman wears a torso harness which he attaches to the parachute canopy and seat every time he enters the craft, and which he unlatches every time he leaves, the automatic latch of a series is positioned between the manual latch and the parachute canopy. This eliminates the need for the airman to carry the automatic latch in daily operations during his walks to and from the craft.

The novel features of the invention are set forth with particularity in the appended claims. The invention will be best understood from the following description when read in conjunction with the accompanying drawings.

BRIEF DESCRIPTION OF THE DRAWINGS

FIG. 5 is a perspective view of a latch assembly of the type shown in FIG. 3;

FIG. 6 is a partial sectional view taken on the line 6—6 of FIG. 5;

FIG. 7 is a partial view of the squib firing mechanism of the latch assembly of FIG. 5; and FIG. 8 is a schematic diagram of a circuit for operating the emergency apparatus of FIG. 1.

DESCRIPTION OF THE PREFERRED EMBODIMENTS

Figure 1:
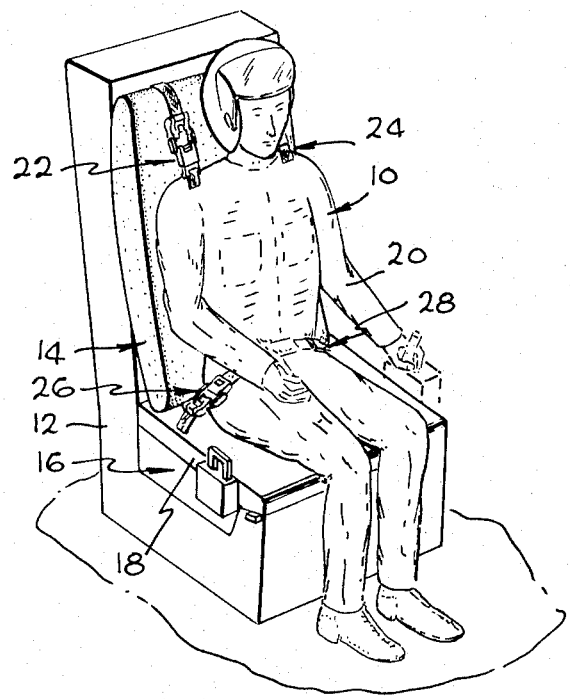
FIG. 1 is a perspective view of an airman in place on an ejection seat which is normally held in an aircraft.

FIG. 1 shows the manner in which an aircrewman 10 is held on an ejection seat 12 in an aircraft during normal flight. The ejection seat 12 holds a parachute 14 which forms the backrest for the airman. The ejection seat also holds a kit 16 which contains emergency equipment such as a life raft and survival package, the lid 18 of the kit forming the seat surface on which the airman sits. The airman wears a torso harness 20. The shoulder portions of the harness are connected by a pair of latch assemblies 22, 24 to the parachute. Waist portions of the harness are connected by a pair of latch assemblies 26, 28 to the lid 18 of the emergency kit 16.

Figure 3:
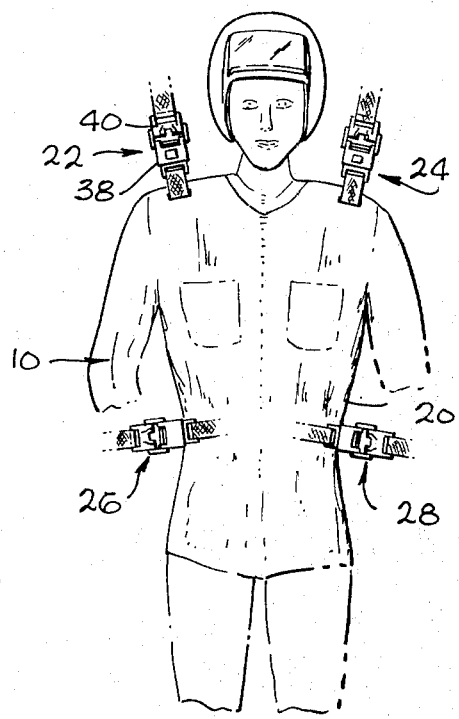
FIG. 3 is a front view of the airman of FIG. 1, showing his manner of latch connection to equipment that is normally in the aircraft.

In normal daily operations, the airman walks to and from the aircraft in his torso harness 20, connecting all four latches every time he enters the craft for a flight and releasing all latches prior to leaving the craft. The latching and unlatching is accomplished by manually operable portions of the latch assemblies. As shown in FIG. 3, each parachute latch assembly 22, 24 includes a manually operable latch 38 and a separate automatically operable latch 40. The seat latch assemblies 26, 28 are similarly constructed. All of the manually operable latches are released by lifting up on a lever. All automatically operable latches are released by the firing of a squib in the latch. The squibs are fired electrically.

Figure 2:
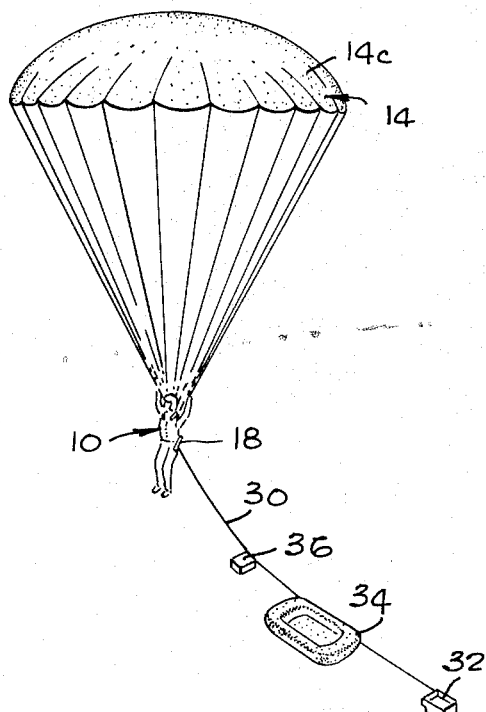
FIG. 2 is a perspective view of the airman of FIG. 1 after ejection from an aircraft, shown during parachute descent.

Emergencies requiring the airman to quickly leave the craft can occur under several types of conditions. One condition is where the craft is airborne. In this situation, the entire seat 12 is propelled from the rest of the craft, and after it falls away from the airman 10, parachute 14, and emergency kit 16, the parachute 14 opens. Several seconds after the parachute opens, the emergency kit 16 is deployed and the life raft therein is inflated so that the airman descends in the manner shown in FIG. 2. In this condition, the airman is held against the cover 18 of the emergency kit while a lanyard 30 extends from it, with the case 32 of the kit dangling at the end of the lanyard. Also attached to the lanyard is a life raft 34 and a survival package 36.

As soon as the airman descends on land or water, he should be released from the parachute canopy 14C. Immediate release is important because the canopy can drag him across land and cause injuries, or cover him in the water and drown him. In some situations the airman may be injured or unconscious, so that automatic release from the canopy upon complete descent would be desirable where such completion of descent can be sensed.

FIG. 8 illustrates a circuit constructed in accordance with the invention for operating the emergency equipment which is described above. The circuit includes a portable power cell or battery 50 which charges each of three storage capacitors 52, 54 and 56. One of the storage capacitors 56 can operate a kit release squib 58 that separates the cover 18 of the emergency kit 16 from the case 32 thereof, so that the life raft 34 is free to be inflated. Another storage capacitor 54 can energize a life raft squib 60 which opens a cartridge of compressed gas to inflate the life raft. The other storage capacitor 52 can energize a pair of canopy separator squibs 62, 64 that operate the automatic latches 40 that release the airman from the parachute canopy. The capacitor 52 can also energize a pair of lap belt separator squibs 66, 68 that operate another pair of automatic latches that separate the airman from the seat surface on which he sits in the craft (the surface of lid 18 of the emergency kit).

An understanding of the circuit of FIG. 8 can be best obtained by considering the manner in which it operates in the case where an airman ejects while flying over water. After the parachute canopy is deployed (by apparatus not shown) the kit release squib 58 should be fired to open the emergency kit 16 where the life raft and survival package are stored. Firing of the squib 58 is accomplished by discharging the storage capacitor 56 through a silicon controlled rectifier (SCR) 70. The SCR has cathode and anode terminals connected in series with the storage capacitor and squib, and a gate terminal 72 which fires the SCR when its potential is raised to a predetermined level.

The operation of the circuit portion for firing the kit release squib 58 begins when a canopy stretch sensing switch 76 is closed by tension occurring in the parachute stringers when the parachute canopy opens. Thereafter, current flows from the battery 50 through a current limiting resistor 78 to a timing capacitor 80 to charge the timing capacitor. Charging of the timing capacitor continually increases the voltage on the emitter 82 of a unijunction transistor 84. After a predetermined delay, such as four seconds, the emitter 82 reaches the peak point voltage to switch the emitter-tobase 1 resistance of the transistor to a very low value, so that capacitor 80 discharges quickly through the emitter-to-base 1 junction and resistor 88. Current flowing through resistor 88 raises the voltage of the SCR gate terminal 72 to fire the SCR. Current then flows from the storage capacitor 56 through the SCR and through the kit release squib 58 to fire it and open the emergency kit.

As soon as the emergency kit has been opened, the life raft squib 60 can be fired to inflate the life raft. A kit deployment sensing switch 90 is provided which closes when the kit is deployed, thereby allowing the storage capacitor 54 to be discharged through the squib 60. The life raft then inflates. Thereafter, the airman continues to descend under the opened parachute canopy in the manner shown in FIG. 2.

When the airman descends to the water, which may require up to about twenty minutes in the case of high altitude ejections, he must be quickly released from the parachute canopy. As mentioned above, this is accomplished by firing the canopy separator squibs 62, 64 that operate the automatic latches that hold his torso harness to the canopy. The firing of the squibs 62, 64 is accomplished when another SCR 92 is fired. The SCR 92 has a gate terminal 94 which is connected through a resistor 96 and a water sensing switch 98 to a positive terminal of the storage capacitor 52. As soon as the airman is immersed in water, the water sensing switch 98 closes, raising the potential of the SCR gate 94, and firing the SCR to discharge the capacitor 52 through the canopy separator squibs 62, 64. This circuit portion also contains an rf filtering capacitor 99 to prevent firing by electro-magnetic radiation. It may be noted that in the emergency situation, which requires parachute descent, the lap belt separator squibs 66, 68 are not fired. This keeps the airman held to the kit lid, which is tied to the life raft. Thus, the separation of the airman from the canopy occurs automatically, so that the airman is released from the canopy even if he is unconscious.

Figure 4:
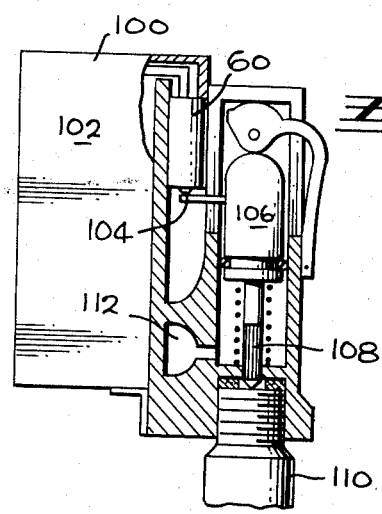
FIG. 4 is a sectional view of a squib-operated actuator mechanism for deploying the life raft shown in FIG. 2.

The deployment of the emergency kit and inflation of the life raft can be accomplished with a variety of squib-operated mechanisms. FIG. 4 illustrates one type of mechanism which utilizes the life raft squib 60 to inflate a life raft. The apparatus includes a housing 100 which has a cavity 102 that contains a portion of the circuitry shown in FIG. 8 which fires the squib 60. When the squib 60 is fired, a piston 104 of the squib is thrust against a plunger 106 to cause a serrated pin 108 thereon to pierce a $CO_2$ cylinder 110. Gas from the cylinder escapes around serrations of the pin 108 and passes through a passageway 112 that leads to the inside of the life raft, to inflate it.

While ejection during flight over water is one type of emergency which must be provided for, provisions must also be made for egress of the airman during emergencies occurring while the craft is on the ground. In the case of carrier based aircraft, particularly, a crash may occur on the carrier or in the water while the pilot and any other crewmen are within the craft. If the airman is not badly injured, he can operate the four latches that hold him to the parachute and the seat in order to egress from the craft. However, the time required to find all four latches and operate them may be highly detrimental. Furthermore, if the airman is badly injured, he may not be able to operate the latches or even a switch that could release all latches. Accordingly, provisions are made for facilitating his release from all four latches in situations where the airman must egress from a downed craft.

Referring again to FIG. 8, the separation of all four automatic latches is accomplished by firing the canopy separator squibs 62, 64 and the lap belt separator squibs 66, 68 from the storage capacitor 52. If the craft is downed in water, the four squibs are fired automatically when water fills the craft to a point where the water sensing switch 98 is immersed and closes. Upon closing of the water sensing switch 98, the SCR 92 fires and allows the capacitor 52 to discharge through all four squibs, if the airman is sitting in the aircraft seat. It may be noted that the lap belt separator squibs 66, 68 do not fire if the airman is descending by parachute. However, if the airman is sitting in the seat, a seat sensor 120 maintains a lap belt switch 122 in a closed position so that current can flow through the lap belt squibs. Thus, the airman is automatically released from all four latches so that he can more quickly leave the craft, particularly if he is injured.

If the airman must egress from a downed craft, either on land, a carrier, or in the water, and he is able to operate a switch, then the apparatus of this invention facilitates his egress. A manual separator switch 124 is provided which can be manually closed by the airman. Upon closing the switch 124, current flows directly from the storage capacitor 52 to the four squibs 62, 64, 66 and 68 to automatically separate the airman from all locations on equipment in the craft. The time required to operate the switch 124 is substantially less than is required to operate all four manually operable latches, so that egress is made more rapid. It may be noted that the manual separator switch 124 is connected in series with another seat sensor operated switch 126. This switch 126 is closed only when the airman is sitting in the seat while it is within the aircraft. The purpose of the switch, or interlock 126 is to prevent an airman from accidentally operating the manual separator switch 124 while he is descending by parachute, which would release him from the canopy prior to full parachute descent. Thus, the emergency activating apparatus not only facilitates the more complex operations required in a parachute escape, but also aids in rapid egress when the craft is downed, and aids the airman even if he is fully conscious and uninjured.

In order for the emergency activating apparatus to operate under the conditions described above, all three storage capacitors 52, 54 and 56 should be maintained fully charged at all times prior to their discharge through squibs. It would be possible to keep the storage capacitors continually charged from the electrical system of an aircraft, but the charging source would then be removed after ejection from the craft. During a long descent of perhaps twenty minutes, the capacitor 52 might discharge enough so that it cannot fire the squibs. Furthermore, a connection to the electrical system of the craft requires means for reliably separating the capacitor from electrical connectors in an emergency, which increases the complexity and reduces reliability. Another way to provide squib firing currents is to provide a storage battery that is connected to the capacitor to charge it only upon the occurrence of an emergency. This is highly unsatisfactory because it may require a period such as a minute to charge the capacitor, and furthermore, electrolytic capacitors require the application of a forming voltage for a period such as a few minutes to effectively hold a charge. Still another possible energy source is a thermal battery which is activated upon the occurrence of an emergency. However, in the present state of the art, such batteries provide considerable heat which must be dissipated.

The battery 50 which keeps the capacitors charged can be a high resistance type such as a mercury cell, such cells being highly reliable and having a long shelf life. Such high resistance cells can be utilized because only a small electrical current is required to replace current that leaks from the capacitors. As a result, relatively small mercury cells can be continually connected to the capacitors to keep them reliably fully charged over a period of several years, although regular maintenance checks can be made and the batteries replaced at somewhat shorter intervals. Of course, it is possible to utilize a separate battery for each storage capacitor, so that in the circuit of FIG. 8, three separate batteries would be employed. However, a single battery can simplify the mechanism. It may be noted that each of the capacitors 52, 54 and 56 is charged from the battery 50 through a high resistance resistor 130, 132 or 134. This prevents one of the storage capacitors which is discharging to fire a squib, from drawing off substantial current from any of the other storage capacitors.

FIGS. 5, 6 and 7 illustrate details of the latch assembly 22, this assembly being similar to the other three latch assemblies which hold the airman in place. The manually operable latch 38, which is shown in a simplified representation, is a type of latch that is standard equipment in many types of craft. It is largely for that reason, that that type of latch is included in the latch assembly 22. The manually operable latch 38 includes a male part 140 which is connected to a strap 142 that ties to the airman's torso harness, and a female part 144 that receives and holds the male part. A release lever 146 is provided which can be raised to release the male part. The automatic latch 140 of the latch assembly includes a male part 148 which is held by a female part 150 that holds a strap 152 that leads to the parachute canopy. The female part 150 releases the male part 148 only when a sufficient current is delivered through a cable 154 to fire a squib in the female part.

Prior to firing the squib, the male and female parts of the automatic latch 40 are held together by reason of a rod 156 of the male part being supported by a pair of fingers 158 on the female part. A lever 160 pivotally mounted at 162 on the female part traps the rod 156 in place. As shown in FIG. 6, the lever has an operating end 164 which is prevented from pivoting inwardly by a slug 166, and it therefore holds the rod 156 of the male part in place. Movement of the slug 166 out of the position behind the operating end 164 will allow the operating end 164 to move inwardly, thereby allowing the lever to pivot to a position to release the rod 156 of the male part.

FIG. 7 shows the squib 168 that can move the slug 166 to release the male part of the automatic latch. Prior to firing the squib, a shear pin 170 holds the slug against movement away from the squib. However, when the squib 168 is fired, a piston 172 therein moves outwardly, causing the slug to shear the pin 170 and move away from a position behind the operating end 164 of the lever. The male part 148 of the automatic latch can then be pulled away from the female part.

During normal egress from the aircraft, the airman unlatches the four manually operable latches 38 by lifting up on the release lever 146 of each latch. He is then not only free from the aircraft, but is free of the automatic latch 40 and does not have to carry it with him. In an emergency, when the squib of the automatic latch 40 is fired, the airman is released from all portions of the automatic latch except the male part 148. The male part 148 is relatively simple and lightweight so there is very little extra apparatus for him to carry out of the craft.

Thus, the invention provides apparatus for activating emergency equipment, including squib firing circuits which can be retained in a standby basis over a long period of time prior to an emergency. Furthermore, the apparatus operates almost instantaneously when needed, either at the time of an emergency while the airman is in the craft, or at a later time after the airman has left the craft. The invention also provides apparatus which can be operated by the squib, which enables rapid release of an airman from the craft or from emergency equipment to which he is fastened, after leaving the craft (the parachute). The release apparatus also enables convenient routine ingress and egress from the aircraft, and does not interfere with manual operation of the latching apparatus which an airman may instinctively try to operate manually in an emergency.

Although particular embodiment of the invention have been described and illustrated herein, it is recognized that modification and variations may readily occur to those skilled in the art and, consequently, it is intended that the claims be interpreted to cover such modifications and equivalents.

What is claimed is:

1. In emergency apparatus normally held within a craft and ejected from said craft upon the operation of emergency switch means that is operated upon the occurence of an emergency requiring egress from the craft, said emergency apparatus having squib means for operating said emergency apparatus at a time after said ejection, the improvement comprising:

a capacitor mounted on said emergency apparatus for ejection with it from said craft;

an electrical battery mounted on said emergency apparatus for ejection with it, said battery being of a type which utilizes a chemical reaction to generate current and which always supplies a voltage between its output terminals until it is exhausted;

means for connecting said battery to said capacitor substantially continuously at least from a time prior to operation of said emergency switch means to a time after ejection of said emergency apparatus from said craft, so that said capacitor is maintained in a charged state prior and after operation of said emergency switch means; and means responsive to an occurrence normally occurring after ejection of said emergency apparatus from said craft, for at least partially discharging said capacitor through said squib means.

2. The improvement described in claim 1 wherein:

said emergency apparatus includes a first device for operation by said squib means and a second device for operation by a second squib means; and including a second capacitor mounted on said emergency apparatus;

means for connecting said battery to said second capacitor substantially continuously at least from a time prior to operation of said emergency switch means to a time after ejection of said emergency apparatus from said craft; and means responsive to a second occurrence normally occurring after ejection of said emergency apparatus from said craft, for at least partially discharging said second capacitor through said second squib means.

3. In a system for holding an airman or the like securely to equipment which is normally held in a craft, and for quickly releasing him from said equipment, the improvement comprising:

a plurality of manual latches, each having a pair of latch parts for manual coupling and uncoupling;

a plurality of automatic latches, each having a pair of automatic latch parts normally held together, and squib means for releasing said automatic latch parts so they can separate;

means for connecting each of said manual latches in series with one of said automatic latches to form a plurality of series-connected latch sets;

means for coupling one latch part of each series-connected latch set to said airman and another latch part thereof to a location on said equipment, so that release of either latch of a series-connected latch set will release said airman from a corresponding location on said equipment;

an electrical energy source; and emergency switch means for coupling said electrical energy source to said squib means of each of said automatic latches, whereby to simultaneously release said airman from all locations where he is tied to said equipment when said emergency switch means is operated.

4. The improvement described in claim 3 wherein:

said equipment is designed for ejection from said aircraft with said airman;

said electrical energy source includes a portable battery for operation independently of said aircraft and which is a type of battery that always supplies a voltage output until it is exhausted, and a capacitor connected to said battery to keep said capacitor charged prior to an emergency; and said emergency switch means includes means for coupling said capacitor to said squib means.

5. The improvement described in claim 3 wherein:

the automatic latch of each series-connected latch set is located between the manual latch of that set and a location on said equipment, whereby the airman does not have to regularly carry the automatic latches to and from the aircraft.

6. A process for automating the emergency release of a person from equipment to which he is held by a manually operable latch of a predetermined type which is of proven reliability and familiar manner of operation comprising:

connecting an automatically operable latch in series with a manually operable latch of said predetermined type which has latching parts that are independent of parts of said automatically operable latch; and coupling emergency sensing means to said automatically operable latch to operate said latch when an emergency is sensed.

7. The process described in claim 6 wherein:

said manually operable latch is located between said person and said automatically operable latch, whereby to minimize the weight of equipment which said person must carry.

* * * * *